Jan. 27, 1953   J. BLAZEJ   2,626,443
SNAP FASTENER SOCKET ASSEMBLY
Filed May 19, 1950
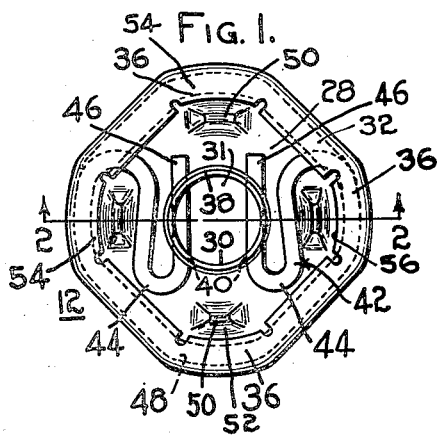
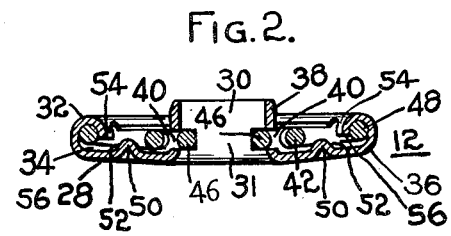
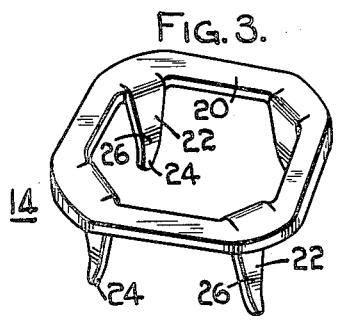
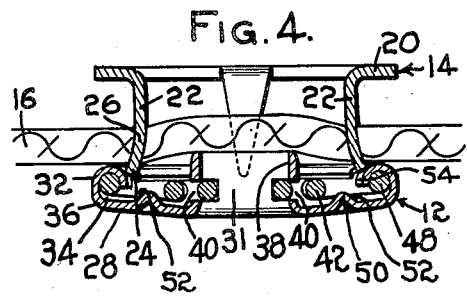
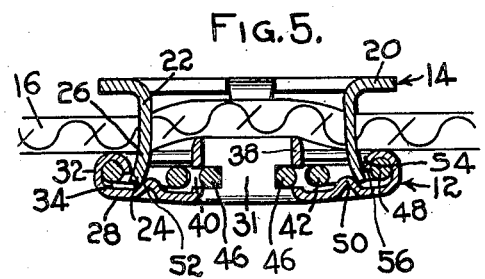
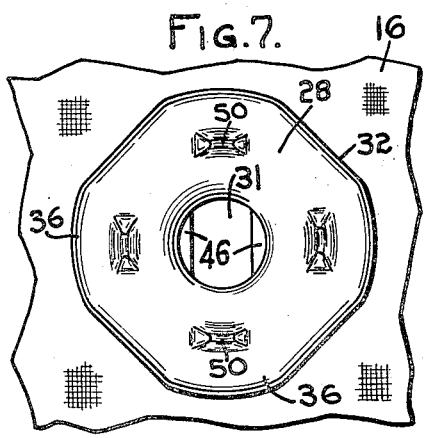
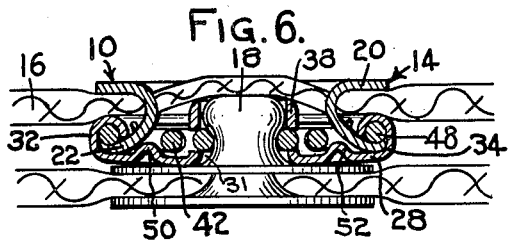
INVENTOR:
JOSEPH BLAZEJ,
BY Philip E Parker
ATTORNEY.

Patented Jan. 27, 1953

2,626,443

UNITED STATES PATENT OFFICE 2,626,443

SNAP FASTENER SOCKET ASSEMBLY

Joseph Blazej, Chicago, Ill., assignor to United-Carr Fastener Corporation, Cambridge, Mass., a corporation of Massachusetts Application May 19, 1950, Serial No. 162,964

9 Claims. (Cl. 24—218)

This invention relates generally to snap fasteners, and has particular reference to a snap fastener member of the type which is adapted to be secured to one side of a supporting sheet by means of a pronged attaching member disposed on the other side.

The object of the invention is to provide a snap fastener half member which is provided with prong-receiving means and upper and lower camming surfaces associated therewith to engage the ends of attaching prongs and guide them into the prong-receiving means.

A further object of the invention is to provide a snap fastener socket member having a base with prong-receiving means disposed thereon, and individual embossments formed on the base to provide camming surfaces for guiding the attaching prongs into the prong-receiving means.

Another object of the invention is to provide a snap fastener half assembly in which an attaching member having attaching prongs and a snap fastener half member having prong-receiving means are provided with cooperating snap shoulder portions to enable the attaching member and the snap fastener half member to be snapped together so that the prongs are properly positioned for entering prong-receiving means.

Other objects of the invention will, in part, be obvious and will, in part, appear hereinafter.

In the drawing:

Fig. 1 is a plan view of a socket member embodying the features of the invention;

Fig. 2 is a view in section taken on line 2—2 of Fig. 1;

Fig. 3 is a perspective view of an attaching member for use with the socket of Fig. 1;

Fig. 4 is a view in elevation, partly in section, illustrating the first step in the assembly of the attaching member and the socket member;

Fig. 5 is a view similar to Fig. 4 illustrating the attaching member and the socket member in preliminary snapping engagement;

Fig. 6 is a view similar to Fig. 5 in which the attaching member and the socket member have been forced into final engagement and a stud member assembled therewith; and Fig. 7 is a bottom plan view of the assembled socket member.

Referring to the drawing, there is illustrated an assembly 10 of a snap fastener half, which may be a stud or a socket half, but as here shown comprises a snap fastener socket member 12 and an attaching member 14 which are adapted for assembly on opposite sides of a supporting sheet 16, for engagement with a shouldered stud 18.

The attaching member 14, in the illustrated embodiment, comprises a base 20 in the form of a ring or band having a series of attaching prongs 22 extending angularly and downwardly therefrom. The prongs 22 advantageously have outwardly turned end portions 24 forming a shoulder 26 for a purpose to be hereinafter described.

The socket member 12 comprises a base 28, which in the illustrated embodiment is substantially square, and has a stud receiving portion 30 disposed centrally therein, and an upwardly and inwardly turned portion 32 about the periphery forming a beaded recess 34. The corners 36 of the square base may be rounded to improve the appearance of the fastener, and to facilitate attachment as will be hereinafter described. The stud-receiving portion 30 may be conveniently formed by providing a central opening 31 and an upwardly extending cylindrical portion 38 disposed about the opening, having a pair of horizontal slots 40 disposed on opposite sides thereof. A spring member 42 is assembled on the base 28, and comprises a pair of looped portions 44 having parallel legs 46 disposed in the slots 40 for snapping engagement with the stud 18. The looped portions 44 are connected by a retaining portion 48 which is disposed in the recess 34 to retain the spring in assembly with the base.

In the preferred form of the device, the base is slightly concavo-convex, with the spring and the recess being disposed on the concave side. A series of individual embossments 50 are provided on the base near the corners thereof, below and radially inwardly of the recess 34 and each embossment 50 has an outwardly inclined camming surface 52, to engage the end of an attaching prong and guide it into the recess 34 at the corners 36 of the base. The embossments 50 extend inwardly into the concave portion of the base, so that the convex side of the base is substantially smooth, and are disposed on the base in such a position that they do not interfere with the action of the spring 42. This allows the spring 42 to lie directly against the base so that the parallel legs 46 are disposed as close as possible to the stud-receiving opening 31, thereby enabling the socket to engage a shorter stud member than would otherwise be possible.

The inwardly turned edge portion 36 of the base is provided with an inwardly sloping camming surface 54 at each corner thereof, which are spaced slightly outwardly from the camming surfaces 52 on the base. The camming surfaces 54 terminate in edges 56 which are spaced upwardly from the base, to enable the outwardly turned ends 24 of the attaching prongs to snap thereunder during assembly.

To assemble the component parts of the device to form the snap fastener half 10, the socket member and the attaching member are aligned on opposite sides of the supporting sheet 16 and forced together so that the prongs 22 pierce the sheet 16. The ends 24 of the prongs are so spaced that they initially engage the socket member 12 in the inwardly inclined camming surfaces 54, and cam inwardly thereon to snap into engagement with the socket, so that the shoulder portions 26 of the prongs are disposed under the edges 56 as shown in Fig. 5.

When the parts have been snapped together as described, the ends 24 of the prongs rest on the lower camming surfaces 52 and thus are properly positioned for the final attaching operation, which consists of forcing the parts further together. This causes the ends 24 of the prongs to turn outwardly on the camming surfaces 52 into the recess 34 at the corners of the base, thereby retaining the parts in assembly as shown in Fig. 6.

Although in the illustrated embodiment, the socket member is square to facilitate alignment in automatic attaching machines, it will be understood that for some applications circular sockets, or sockets of other desired shape may be used with equally good results. The features of the invention are not limited to use in attachment of socket members, but may also be used in the attachment of stud members.

Since certain other obvious modifications may be made in the device without departing from the scope of the invention, it is intended that all matter contained herein be interpreted in an illustrative and not in a limiting sense.

I claim:

1. A snap fastener half assembly comprising a fastener member and a pronged attaching member for assembly on opposite sides of a supporting sheet, said fastener member comprising a base provided with peripheral sections having upwardly, inwardly and downwardly curved portions presenting opposed free snap fastener edge portions spaced from said base, said attaching member comprising a cap portion and a circular series of resilient attaching prongs extending angularly therefrom, and provided with outwardly turned pointed ends, the diameter of said pronged attaching member as defined by the free terminal ends of said prongs being slightly in excess of the distance between opposed snap fastener edge portions of the fastener member for snap fastener engagement therewith whereby said prongs may be contracted by engagement with the inwardly and downwardly curved portions of said peripheral sections and into snap fastener engagement with the free edge thereof to prelocate said fastener and attaching member upon opposite sides of a supporting sheet in snap fastener engagement with each other prior to final interlocking of said members.

2. A snap fastener half assembly comprising a fastener member and a pronged attaching member for assembly on opposite sides of a supporting sheet, said fastener member comprising a base provided with a peripheral rim having an upwardly, inwardly and downwardly turned wall portion presenting opposed free snap fastener edge portions spaced from said base, and said attaching member comprising a band-like cap member and a circular series of pointed yielding attaching prongs extending angularly therefrom and provided with snap fastener means at their terminal ends, the diameter of the pronged attaching member as defined by the free terminal ends of said prongs being slightly in excess of the distance between opposed snap fastener edge portions of the downwardly turned wall portions whereby the prong ends may be contracted by engagement with the inwardly and downwardly turned wall portion into snap fastening engagement with snap fastener edge portions of said fastener member, and means on said fastener member for bending said prongs into said peripheral rim upon application of axial deforming pressure applied to said members.

3. A snap fastener half assembly comprising a fastener member and a pronged attaching member, said fastener member comprising a base provided with a peripheral rim having an upwardly, inwardly and downwardly turned wall portion presenting opposed free snap fastener edge portions spaced from said base, and said attaching member comprising a band-like cap member and a circular series of pointed yielding attaching prongs extending angularly therefrom and provided with snap fastener means at their terminal ends, the distance between the ends of opposite prongs being in excess of the distance between opposed snap fastener edge portions to be contracted by said inwardly and downwardly curved wall portions into snap fastener engagement with said free edge portion of the downwardly turned wall portion, said fastener and attaching members being manually separable for application to opposite sides of a supporting sheet.

4. A snap fastener half assembly as defined in claim 3 in which the base of the fastener member is provided with a prong-turning camming surface disposed in spaced relation below and radially inwardly of said free edge portion of the downwardly turned wall portion.

5. A snap fastener socket assembly comprising a fastener socket member and a pronged attaching member for assembly on opposite sides of a flexible supporting sheet, said fastener socket member comprising a base provided with a peripheral bead having an inwardly and downwardly turned camming surface terminating in spaced relation to said base, said base being provided with an open ended tubular stud-receiving sleeve, a spring member assembled with said socket member in spaced relation to said base and comprising a retaining portion disposed within said peripheral bead and a pair of looped portions having substantially parallel stud-engaging legs disposed in opposite sides of said stud-receiving sleeve, said attaching member comprising a cap member and a circular series of resilient prongs extending angularly therefrom and provided with out-turned sheet-piercing ends, the diameter of the pronged attaching member as defined by the outturned terminal prong ends being slightly in excess of the distance between opposed camming surfaces of said bead whereby said rounded camming surfaces provide a sole support for a flexible supporting sheet closely adjacent to the points pierced by said prongs to hold material of a supporting sheet taut between said prongs.

6. A snap fastener socket member for use with a pronged attaching member having outwardly turned prong ends, said member comprising a base provided with a peripheral bead having inwardly and downwardly turned walls terminating in a free edge spaced from said base, said base being provided with a central tubular stud-receiving portion, a spring member assembled with said socket member in spaced relation to said base and comprising a retaining portion disposed within said peripheral bead and a pair of looped portions having substantially parallel ends disposed on opposite sides of said tubular stud-receiving portion, said base being further provided with circularly spaced individual embossments disposed below and radially inward of said free edge portion, each of said embossments having an inclined prong-bending cam surface for deflecting the prongs of a pronged attaching member outwardly into said peripheral bead portion under the retaining portion of said spring.

7. A snap fastener half assembly as set forth in claim 3, in which the fastening member base is substantially square, and said base is provided with an individual embossment near each corner thereof, each of said embossments having an outwardly inclined camming surface to engage the end of an attaching member prong and to assist in turning the prong outwardly into the recess when the attaching member and the fastening member are forced further together after they have been snapped together.

8. A snap fastener socket member adapted for assembly on one side of a supporting sheet by means of a pronged attaching member disposed on the other side, said socket member comprising a base having a stud-receiving portion disposed centrally therein, and an inwardly curled edge portion forming a peripheral recess and having a free edge spaced from said base, a spring member assembled on the base, said spring comprsing a stud engaging portion associated with the stud-receiving portion of the base, and a retaining portion disposed in the peripheral recess, said base having a series of individual embossments formed thereon, each of said embossments having an inclined prong-turning camming surface disposed below and radially inwardly of said free edge to turn the ends of the attaching member prongs outwardly into the recess when the socket member and the attaching member are forced together.

9. A snap fastener socket member adapted for assembly on one side of a supporting sheet by means of a pronged attaching member disposed on the other side, said socket member comprising a substantially smooth square base having a stud-receiving portion disposed centrally therein, and inwardly turned edge portions forming a recess about the base and a spring member assembled on the socket member in spaced relation to the base, said spring member comprising a pair of parallel arms disposed on opposite sides of the stud receiving portion for engagement with the stud, and a retaining portion connecting the parallel arms, said retaining portion being disposed in the recess, said base having four individual embossments formed therein near the corners thereof, each of said embossments having an outwardly inclined camming surface to turn the ends of the attaching prongs outwardly into the recess at the corners of the base and under the retaining portion of the spring when the socket member and the attaching member are forced together.

JOSEPH BLAZEJ.

REFERENCES CITED

The following references are of record in the file of this patent:

UNITED STATES PATENTS

| Number | Name | Date |
| --- | --- | --- |
| 1,222,096 | Galt | Apr. 10, 1917 |
| 2,015,049 | Carr | Sept. 17, 1935 |
| 2,131,347 | Fenton | Sept. 27, 1938 |
| 2,279,720 | Reiter | Apr. 14, 1942 |
| 2,286,438 | Reiter | June 16, 1942 |
| 2,509,434 | Huelster | May 30, 1950 |